April 14, 1964  R. J. GAUBERT  3,128,660
WEB CUTTING MECHANISM
Filed April 4, 1960  3 Sheets-Sheet 1

INVENTOR
RENE J. GAUBERT
BY Hans G. Hoffmeister
ATTORNEY

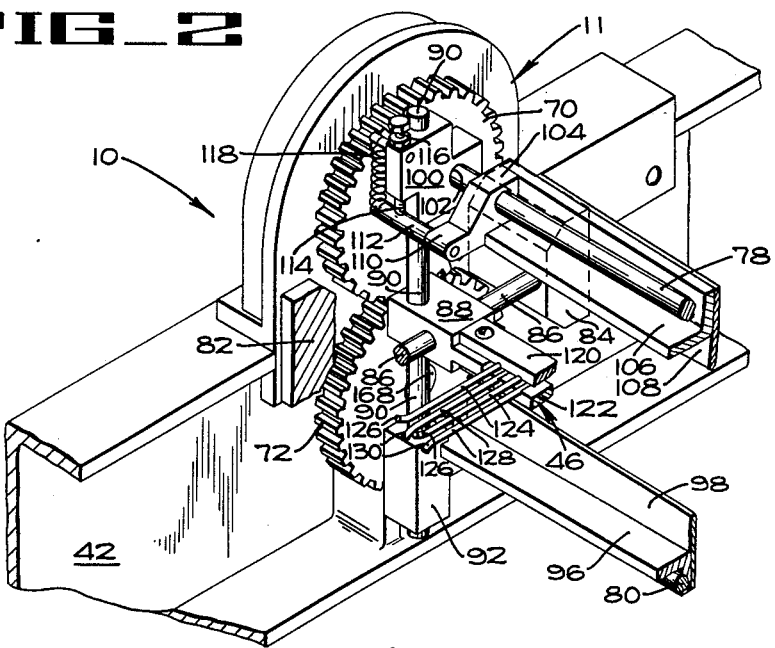

April 14, 1964 R. J. GAUBERT 3,128,660
WEB CUTTING MECHANISM
Filed April 4, 1960 3 Sheets-Sheet 3
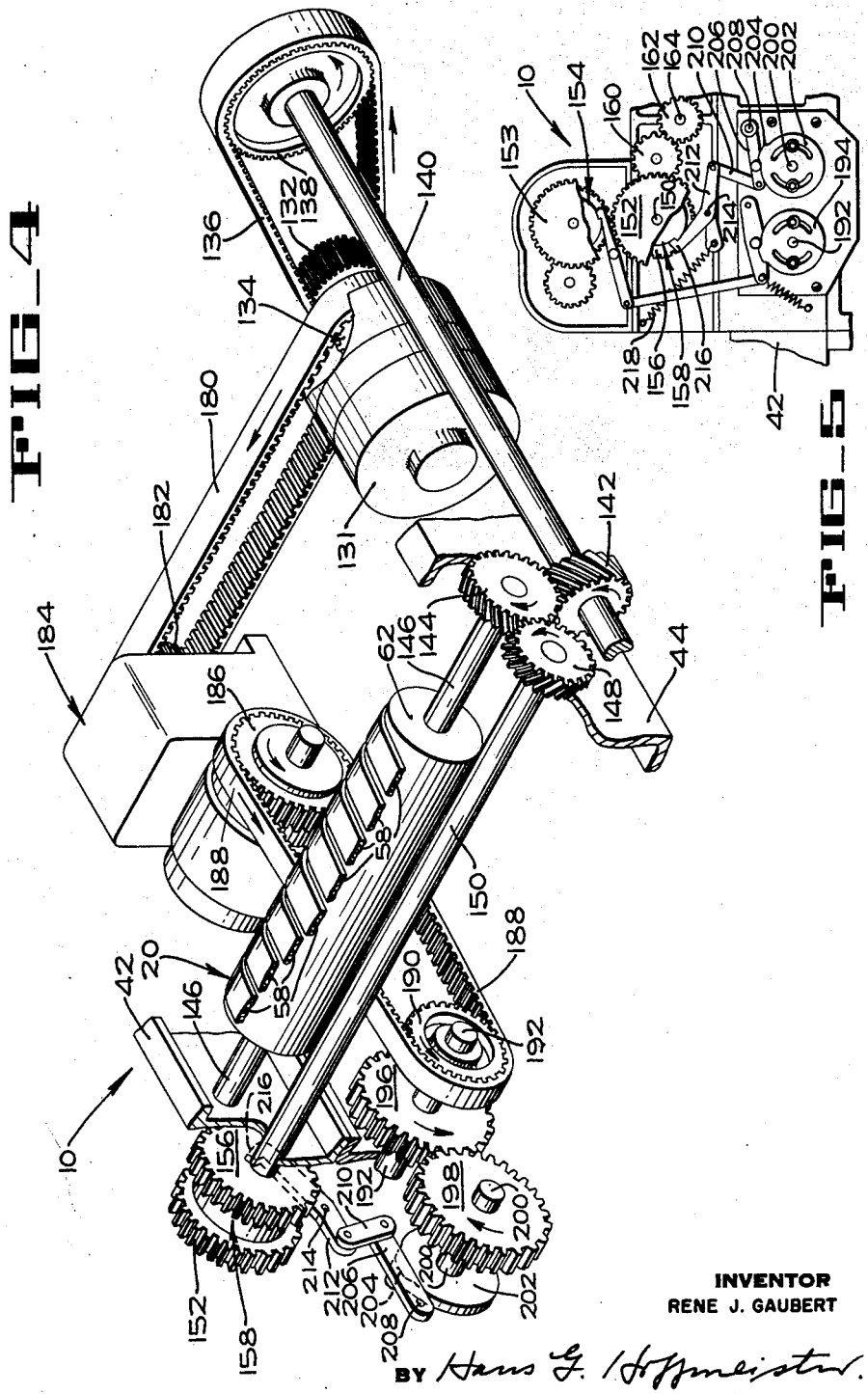
INVENTOR
RENE J. GAUBERT
BY Hans G. Hoffmeister
ATTORNEY United States Patent Office 3,128,660
Patented Apr. 14, 1964

3,128,660
WEB CUTTING MECHANISM
Rene J. Gaubert, 4206 Oakmore Road, Oakland, Calif.
Filed Apr. 4, 1960, Ser. No. 19,629
23 Claims. (Cl. 83—155)

This invention pertains to a web shearing mechanism. More particularly, the invention relates to a shearing mechanism for cutting a continuous web of sheet material into individual sheets of predetermined length.

The web shearing mechanism of the present invention is particularly advantageous for use in a bag making machine wherein sheet material is first formed into a continuous flattened tube and then sealed transversely at equally spaced intervals. The shearing mechanism of the present invention is used to sever the tube transversely adjacent each of the sealed areas to separate the continuous tube of material into individual bags.

An object of the present invention is to provide a shearing mechanism for severing transversely a moving continuous web of material.

Another object of the invention is to provide a web severing mechanism wherein the shearing knives are orbitally mounted so that they travel with the web at substantially the same speed as they are severing the same.

Another object of the invention is to provide a shearing mechanism wherein the knives when actuated are operated in timed relation with the speed of advance of the web, and wherein the knives are periodically actuated at predetermined intervals to sever the web into sheets of predetermined length.

Another object is to provide a periodically actuated shearing mechanism which is adjustable to vary the duration of the period between actuations of the knives to produce bags of different lengths without affecting the timed relation between the speed of operation of the knives and the speed of advance of the web.

Various other objects and advantages of the present invention will become apparent from the following detailed description and accompanying drawings, in which:

FIG. 2 is a fragmentary perspective of one end of the shearing mechanism of FIG. 1.

FIG. 3 is a fragmentary perspective of a portion of the drive for the shearing mechanism and discharge conveyor.

FIG. 4 is a fragmentary perspective of a portion of the drive for the shearing mechanism and the variable speed drive for the timing cams.

FIG. 5 is a side elevation, drawn to a reduced scale, of the timing cams, and the linkage connecting the cams to the one revolution drive clutch for the shearing mechanism, and the drive clutch for a stacking mechanism (not shown).

Figure 1:
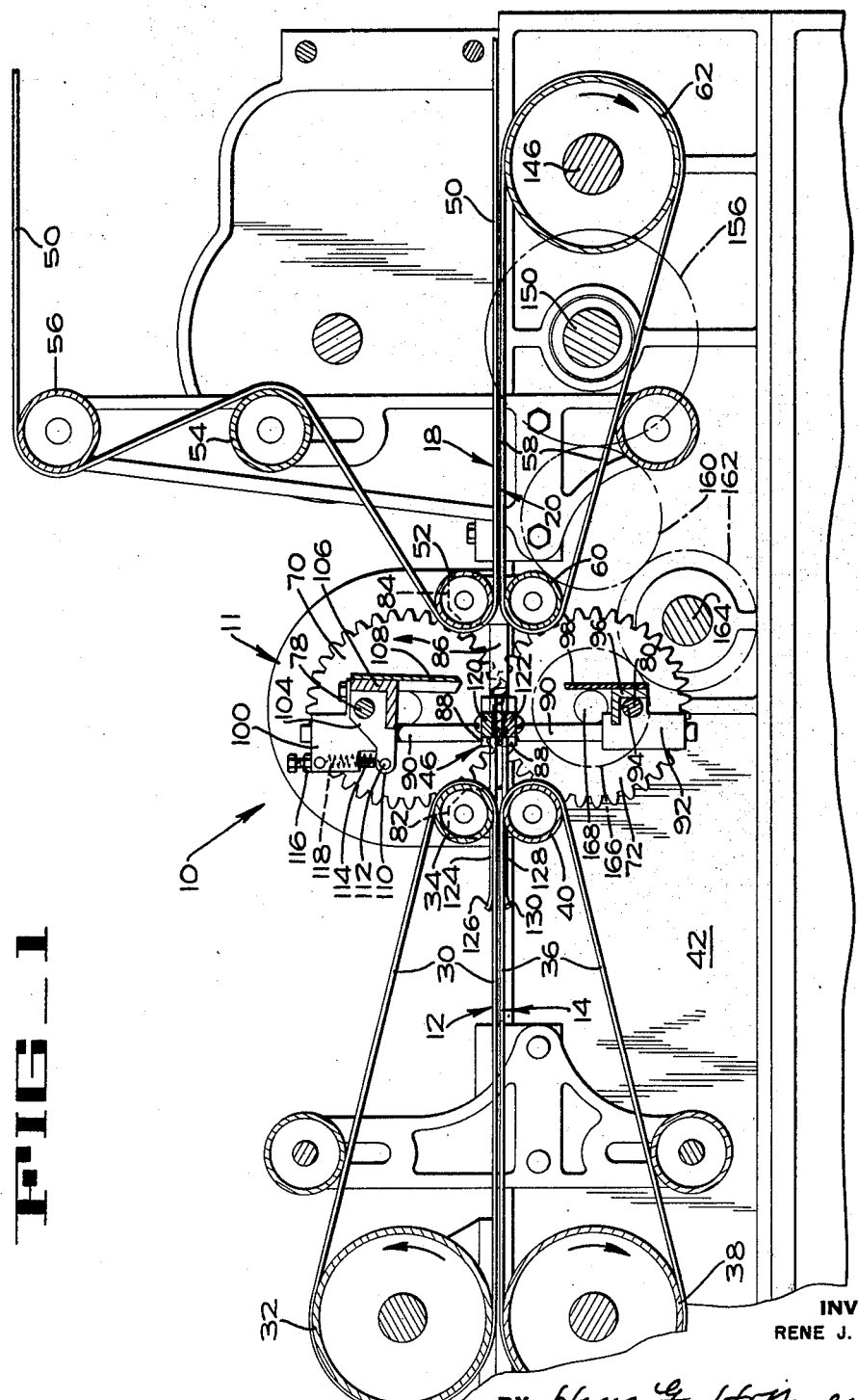
FIG. 1 is a fragmentary vertical section along the longitudinal center line of a bag making machine incorporating the transverse web shearing mechanism of the instant invention.

Referring now to the drawings and particularly to FIG. 1 thereof, 10 indicates a portion of a bag making machine. The sheet material which is converted into bags by the machine 10 is delivered to the cutting mechanism 11 of the present invention by and between two parallel runs of opposed endless conveyors 12 and 14, respectively. The machine 10 includes a forming mechanism (not shown) that forms the bag stock into a continuously advancing flattened tube, and a sealer (not shown) which seals the tube of bag stock transversely at equally spaced intervals longitudinally thereof. The sealer advantageously could be, but is not necessarily, that shown and described in my copending application Serial No. 780,545, filed December 15, 1958, and entitled "Heat Applying Apparatus," now Patent Number 2,984,288. After being severed from the tube or web of material by the shearing mechanism 11 of the present invention, the cut sheets or bags are then delivered by discharge conveyors 18 and 20 to a stacking mechanism (not shown), but which for example, could be that disclosed in my copending application Serial No. 795,475, filed February 25, 1959, and entitled "Stacking Mechanism," now Patent Number 3,024,921.

The conveyor 12 comprises a plurality of parallel endless belts 30 trained around drums 32 and 34. Similarly, the conveyor 14 comprises a plurality of parallel endless belts trained around drums 38 and 40. The drums 32 and 38 extend between and are suitably mounted on side frames 42 and 44 of the machine in opposition to each other, and for rotation about their respective axes. The drums 32 and 38 are driven in opposite directions, as indicated by the arrows (FIG. 1), by a suitable drive mechanism (not shown). The drums 34 and 40, also, extend between and are mounted on the side frames 42 and 44 of the machine in opposition to each other, and for rotation about their own axes. The lower reaches of the belts 30 and the upper reaches of the belts 36 are in contiguous relation with each other whereby they will advance a web of material interposed therebetween from left to right as viewed in FIG. 1 and deliver it to the shearing mechanism 11.

A web transport mechanism or device 46 (FIGS. 1 and 2) receives the web from between the conveyors 12 and 14 and carries it through the shearing zone and delivers the leading cut end of the web between the discharge conveyors 18 and 20. The transport mechanism 46, and its manner of operation, will be fully described hereinbelow in conjunction with the shearing mechanism 11.

The discharge conveyor 18 comprises a plurality of parallel endless belts 50 trained around suitable drums 52, 54, 56 (FIG. 1) and other drums (not shown) located beyond the stacking unit (not shown herein, but shown and described in my above-mentioned Patent Number 3,024,921). The discharge conveyor 20 comprises a plurality of parallel endless belts 58 trained around drums 60 and 62 which extend between the side frames 42 and 44 and are suitably mounted thereon for rotation about their respective axes.

The shearing mechanism 11 comprises two knife mounting gears 70 and 72 (FIGS. 1, 2 and 3) meshing with each other, and mounted one above the other adjacent the left side frame 42 of the machine, and a similar pair of knife mounting gears 74 and 76 (FIG. 3) rotatably mounted adjacent the right side frame 44 of the machine. A knife carrying rod or journal member 78 (FIGS. 1, 2 and 3) extends between and is fixed at its opposite ends to the two upper knife mounting gears 70 and 74, parallel to and spaced from their common axis of rotation. A similar knife carrying rod or journal member 80 extends between and is fixed at its opposite ends to the two lower knife mounting gears 72 and 76 parallel to and spaced from their axis of rotation. The axis of rotation of each knife mounting gear may be conveniently referred to as a main axis.

Since the two knife guiding mechanisms adjacent the side frames 42 and 44, respectively, are alike, only that adjacent the left side frame 42 will be described in detail. Two blocks 82 and 84 (FIG. 2) are fixed to the side frame 42 adjacent the knife mounting gears 70 and 72, one in back of and one in front of, said gears with their centers on a common horizontal line extending through the point of contact between the two gears. A horizontal or main slide rod 86 extends between and is fixed to the two blocks 82 and 84. A slide block 88 is slidably mounted on the rod 86 for forward and rearward horizontal reciprocating movement. A vertical or auxiliary rod 90 is fixed to the slide block 88 and projects both upward and downward therefrom.

A slide block 92 is slidably mounted on the lower portion of the vertical rod 90 and is provided with a horizontal bore 94 (FIG. 1) through which the lower knife carrying rod 80 extends. An angle iron 96 (FIGS. 1 and 2) is fixed to the slide block 92 and extends transversely across the machine to a similarly mounted slide block (not shown) adjacent the right side frame 44. A lower shearing knife blade 98 is fixed to the forward face of the angle iron 96 and projects upward therefrom.

A slide block 100 is slidably mounted on the upper portion of the slide bar 90 and is provided with a horizontal bore 102 through which the upper knife carrying bar 78 extends. A knife mounting bracket 104 is rotatably mounted on the knife carrying bar 78 adjacent the slide block 100. One end of an angle iron 106 is fixed to the bracket 104. The other end if fixed to a similar bracket adjacent the opposite side of the machine. An upper shearing knife blade 108 is fixed to the forward face of the angle iron 106 and projects downward therefrom.

It will be noted that the plane of the upper knife blade 108 is inclined slightly to the plane of the lower knife blade 98, and that the lower knife edge of the knife blade 108 is slightly lower at one end thereof than at the other end to produce a progressive shearing engagement between the two knife blades as they are moved toward each other. The knife mounting bracket 104 is provided with a rearwardly projecting portion 110 (FIGS. 1 and 2) to which is fixed a laterally projecting pin 112 that projects beneath a portion of the slide block 100 through which an adjusting stop screw 114 is threaded. The adjusting screw 114 bears against the upper surface of the pin 112 to limit clockwise (as viewed in FIGS. 1 and 2) rotational movement of the knife blade 108 about the axis of the knife carrying rod 78. A lock nut 116 is provided to maintain the screw 114 in its adjusted position. A tension spring 118 normally maintains the pin 112 in contact with the stop screw 114, as best shown in FIG. 2.

When the knife mounting gears 70, 72 and 74, 76 are rotated, the knife blades 98 and 108 are moved with orbital translatory movement about the axes of the gears 70, 74 and 72, 76, respectively, and the cutting edges of the knife blades 98 and 108 describe intersecting orbits and are traveling substantially in the same direction, and at the same speed, as the web during the portion of their travel that they are in engagement with each other.

The above-mentioned web transfer mechanism 46 for carrying the web through the shearing zone comprises a pair of vertically spaced transversely extending plates 120 and 122, respectively, fixed at their opposite ends to the horizontal slide block 88 at the left side of the machine and its companion slide block (not shown) at the right side of the machine for forward and rearward reciprocation therewith. A plurality of fingers 124 are fixed to the plate 120 at spaced points therealong and project rearwardly therefrom. The rearmost ends 126 of the fingers 124 are turned upward. Similarly, a plurality of fingers 128 are fixed to the lower plate 122 in opposition to the fingers 124. The rearmost ends 130 of the fingers 128 are turned downward. The fingers 124 and 128 project rearward between the several belts 30 and 36 (FIG. 1) of the conveyors 12 and 14, respectively, so that the web being transported between said conveyors will be projected in the slot between the upper and lower fingers 124 and 128 and plates 120 and 122, respectively, and be carried forward thereby as the shearing mechanism is actuated to present the leading cut edge of the web to the discharge conveyors 18 and 20.

The main machine drive mechanism is best illustrated in FIGS. 3 and 4 and comprises a motor 131 (FIG. 4) having two drive sprockets 132 and 134 fixed to its shaft. A drive belt 136 connects the sprocket 132 with a sprocket 138 on a line shaft 140 (FIGS. 3 and 4) which extends along and is rotatably mounted on the right machine side frame 44. A bevel gear 142 is fixed to the line shaft 140 and meshes with a bevel gear 144 fixed to a transverse shaft 146 on which the drum 62 of the conveyor 20 is mounted. The conveyors 12, 14 and 18 are similarly driven from the line shaft 140 so that they all travel at the same linear speed. Therefore, a drive linkage, including driving and driven gears and shafts and a belt as above specified, interconnects the motor and the conveyors.

The bevel gear 144 meshes with and drives a bevel gear 148 fixed to one end of a transversely extending drive shaft 150. A drive gear 152 is fixed to the opposite end of the shaft 150 and, as shown in FIG. 5, drives a gear 153 of a drive clutch mechanism 154 of the stacking mechanism (not shown). A second or driven gear 156 (FIGS. 3, 4 and 5), freely rotatable on the shaft 150 adjacent the gear 152, is adapted to be clutched to the drive gear 152 by a one revolution clutch assembly or coupling 158. The gear 156 meshes with an idler gear 160 (FIG. 3) which in turn drives a gear 162 fixed to one end of a transverse shaft 164. The gear 162 also meshes with and drives a gear 166 fixed to a shaft 168 on which the lower knife carrying gear 72 is fixed. A gear 170 is fixed to the opposite end of the shaft 164 and drives a gear 172 fixed to a shaft 174 on which the other lower knife carrying gear 76 is fixed. It is evident that there is also a drive linkage, including driving and driven gears and shafts, a belt and the clutch assembly, as above specified, interconnecting the motor 131 and the knife-carrying gears and knives 98 and 108.

Each time the clutch 158 is actuated the knife carrying gears 70, 72, 74 and 76 are rotated through one revolution and then stop and remain motionless until the next time the clutch 158 is actuated. Since the drive for the knife carrying gears is the same as the drive for the conveyors 12, 14, 18 and 20 the knives 98 and 108 will always be operated, when actuated, in timed relation with the conveyor.

The drive mechanism for periodically actuating the clutch 158 comprises a drive belt 180 (FIG. 4) which connects the drive sprocket 134 of the motor 130 and an input sprocket 182 of a variable speed transmission or timing unit 184. The output sprocket 186 of the variable speed transmission unit 184 is connected by a drive belt 188 to a sprocket 190 fixed to a cam shaft 192 on which a cam 194 (FIG. 5) is rigidly but adjustably mounted. The cam 194 controls the drive clutch mechanism 154 for the stacker (not shown). A gear 196 (FIG. 4) is fixed to the cam shaft 192 and meshes with and drives a gear 198 fixed to a second cam shaft 200. A cam 202 (FIGS. 4 and 5) is rigidly but adjustably mounted on the cam shaft 200.

The cam 202 is provided with a cam lobe 204 adapted to actuate a cam follower arm 206 once during each resolution of the cam 202. The cam follower arm 206 is pivotally mounted at one of its ends on a pin 208 fixed to the side frame 42. The opposite end of the cam follower arm 206 is pivotally connected to a link 210, which in turn is pivotally connected to one arm of a bell crank lever 212 pivotally mounted at 214 on the side frame 42. The opposite end 216 of the bell crank 212 is in the form of a hook which latches the clutch 158 in its inoperative position. A tension spring 218 normally retains or holds the hooked end 216 of the bell crank 212 in its clutch latching position.

It should be noted that by varying the ratio of the variable speed transmission unit 184 the speed of rotation of the cam 202, and hence the length of the interval between actuations of the shearing mechanism 11 may be changed without affecting the speed of operation thereof when its actuated.

In the operation of the machine, a continuous web of material is fed to the shearing mechanism 11 by the feed belts 30 and 36. The drive to the knife carrying gears 70, 72, 74 and 76 is periodically actuated by the action of the cam 202 energizing the one revolution clutch 158. When the clutch 158 is energized the knives 98 and 108 make one circuit of their orbits. During the uppermost portion of the travel of blade 98 and the lowermost portion of the travel of blade 108 the edges of the two blades come together at the plane of the web in overlapping progressive shearing engagement with each other to shear the web transversely. It will be noted that during this portion of the blade travel the blades 98 and 108 are moving substantially in the same direction, and at the same speed, as the web. As the blades 98 and 108 separate, the transfer mechanism 46 is adjacent the nip between the rollers 52 and 60 about which the discharge belts 50 and 58 are trained. As the transfer mechanism 46 stops its forward movement, the action of the feed belts 30 and 36 projects the newly cut leading edge of the web into the nip to be engaged by the discharge belts 50 and 58. The knives 98 and 108 and the transfer mechanism 46 continue their movement until they reach their rest positions illustrated in FIG. 1 at which time the clutch 158 disengages. The mechanism is then ready for its next cycle.

While a preferred embodiment of the present invention has been shown and described herein, various changes may be made in its construction without departing from the spirit of the invention as defined in the appended claims.

The invention having thus been described, what is claimed and desired to be protected by Letters Patent is:

1. A mechanism for shearing a web of sheet material comprising means for transporting said web along a predetermined path; two pairs of knife carrying gears mounted one pair adjacent each side of said path of movement; said gears of each pair being mounted one above the other in meshing engagement with each other; an upper shearing knife connected between the two upper knife carrying gears in a position eccentric with relation to the axis of rotation thereof; a lower shearing knife connected between the two lower knife carrying gears in a position eccentric with relation to the axis of rotation thereof; means for guiding said upper and lower knives for translatory movement comprising a horizontal slide rod mounted adjacent each side of said path of movement with its axis parallel thereto, a slide block slidably mounted on each of said horizontal slide rods, a vertical slide rod fixed to each of said slide blocks and projecting both upward and downward therefrom, means slidably connecting the upper shearing knife with the upwardly projecting portion of each of said vertical slide rods, and means slidably connecting said lower shearing knife with the downwardly projecting portion of each of said vertical slide rods; means for driving said knife carrying gears in timed relation with the movement of said web to effect orbital translatory movement of said knives; means for periodically actuating said drive means to cause said knives to shear said web into sheets of predetermined length; and means for varying the period of operation of said drive actuating means to produce sheets of different lengths.

2. In an apparatus for transversely shearing a longitudinally moving sheet material web, a pair of opposed shearing knives; a guide mechanism for said shearing knives comprising a pair of blocks mounted for horizontal reciprocation, a vertical slide rod fixed to each of said blocks, the opposite ends of said shearing knives being slidably received on said vertical slide rods; means for sliding the shearing knives on said guide rods during reciprocation of said blocks to effect a shearing operation of the knives; a delivery conveyor for delivering said web to said shearing knives; a discharge conveyor for carrying cut sheets from said shearing knives; a transfer mechanism comprising a pair of vertically spaced plates extending transversely of the path of movement of said web and fixed at their opposite ends to said blocks, a plurality of fingers fixed to the upper plate and projecting rearwardly therefrom, a plurality of fingers fixed to the lower plate and projecting rearwardly therefrom in opposition to the fingers on said upper plate, said delivery conveyor being adapted to project said web between said upper fingers and plate and said lower fingers and plate; and means for reciprocating said transfer mechanism in timed relation with the operation of said shearing knives and thereby presenting a newly cut leading edge of said web to said discharge conveyor after the operation of said shearing knives.

3. In an apparatus for transversely shearing a longitudinally moving sheet material web, two pairs of opposed meshing knife driving gears one pair adjacent each side of the machine, corresponding gears of said two pairs of gears being coaxially and rotatably mounted, a horizontal slide mechanism adjacent each of said pairs of gears, a vertical slide rod fixed to each of said horizontal slide mechanisms, an upper knife actuating rod extending between two of said coaxially mounted knife driving gears and fixed thereto in a position eccentric with relation to their axis of rotation, an upper knife assembly slidably mounted at its ends on said vertical slide rods and rotatably embracing said upper knife actuating rod, a lower knife actuating rod extending between the other two knife driving gears and fixed thereto in position eccentric with relation to their axis of rotation, a lower knife assembly slidably mounted at its ends on said vertical slide rods and rotatably embracing said lower knife actuating rod, a delivery conveyor for delivering said web to said shearing knives, a discharge conveyor for carrying cut sheets from said shearing knives, a transfer mechanism extending between and fixed to said horizontal slide mechanisms, means for driving said knife driving gears in timed relation with the operation of delivery and discharge conveyors, whereby said knife assemblies are orbited to shear said web and said transfer mechanism is reciprocated to present the newly cut leading edge of said web to said discharge conveyor.

4. In an apparatus for transversely shearing a longitudinally moving sheet material web, two opposed pairs of meshing knife driving gears one pair adjacent each side of the machine, a horizontal slide mechanism adjacent each of said pairs of gears, corresponding gears of said two pairs of gears being coaxially and rotatably mounted, a vertical slide rod fixed to each horizontal slide mechanism, an upper knife actuating rod extending between two of said knife driving gears and fixed thereto in a position eccentric with relation to their axis of rotation, an upper knife assembly slidably mounted at its ends on said vertical slide rods and rotatably embracing said upper knife actuating rod, a lower knife actuating rod extending between the other two knife driving gears and fixed thereto in a position eccentric with relation to their axis of rotation, a lower knife assembly slidably mounted at its ends on said vertical slide rods and rotatably embracing said lower knife actuating rod, a delivery conveyor for delivering said web forwardly to said shearing knives, a discharge conveyor for carrying cut sheets forwardly from said shearing knives, a transfer mechanism comprising two vertically spaced plates extending between and fixed to said horizontal slide mechanisms, a plurality of rearwardly projecting fingers fixed to each of said plates, said delivery conveyor being adapted to project said web between said upper fingers and plate and said lower fingers and plate, and means for driving said knife driving gears in timed relation with the operation of said delivery and discharge conveyors, whereby said knife assemblies are orbited to shear said web and said transfer mechanism is reciprocated to present the newly cut leading edge of said web to said discharge conveyor.

5. A mechanism for shearing a web of sheet material comprising means for moving said web along a predetermined path, a pair of shearing knives having knife edges and being mounted for orbital movement about axes extending transversely of the path of movement of the web, said axes being substantially parallel to each other one above and one beneath said path of movement and being spaced apart a distance such that the orbits described by said edges of the blades intersect said path, rotary drive means, linkage means connected to said drive means and to said knives for imparting orbital movement to said knives, said linkage means including a coupling normally disconnecting said knives from said drive means but being operable to establish connection between said drive means and said knives, timing means engaging said coupling for intermittently operating said coupling thereby intermittently establishing connection between said drive means and said knives, said coupling disconnecting said drive means and said knives after successive connections thereof, and means connected to said timing means for varying the length of the intervals between successive operations of said coupling without interrupting movement of said web.

6. In a web shearing mechanism, a frame, means supported in said frame for transporting a web to be severed along a predetermined path, a pair of main slide rods rigidly mounted in said frame one adjacent each side of the path of said web in substantially parallel relation to said path, a slide block slidably mounted on each of said main slide rods, an auxiliary slide rod carried by each of said slide blocks and projecting in opposite directions therefrom substantially perpendicular to its respective main rod, a pair of shearing knives having opposite ends, means slidably mounting said opposite ends of said knives on said auxiliary slide rods with said blocks being between said knives, and powered means connected to said mounting means for moving said knives about axes substantially normal to said main rods, said knives being constrained to orbital translatory movement about said axes by reciprocation of their ends on said auxiliary rods and by reciprocation of said blocks on said main rods.

7. In a web shearing mechanism including means for transporting a web of sheet material along a predetermined path, two pairs of knife carrying gears rotatably mounted one pair adjacent each side of said path of movement, said gears of each pair being mounted one above the other and in meshing engagement with each other, an upper shearing knife connected between the two upper knife carrying gears in a position spaced from and parallel to the axis of rotation thereof, and a lower shearing knife connected between the two lower knife carrying gears in a position spaced from and parallel to the axis of rotation thereof; apparatus for guiding said upper and lower knives for translatory movement comprising a substantially horizontal main slide rod mounted adjacent each side of said path of movement with its axis parallel thereto, a slide block slidably mounted on each of said main slide rods, a substantially vertical auxiliary slide rod fixed to each of said slide blocks and projecting both upward and downward therefrom, means slidably connecting the upper shearing knife with the upwardly projecting portion of each of said auxiliary slide rods, means slidably connecting said lower shearing knife with the downwardly projecting portion of each of said auxiliary slide rods, and means connected to said gears for moving said knives about the axes of the gears, said knives being constrained by said rods and blocks to move with translatory motion about said axes.

8. In a mechanism for transversely shearing a longitudinally moving sheet material web including a pair of opposed shearing knives mounted for movement toward and away from each other and for movement longitudinally of and in the same direction as said web during shearing of the web, means for imparting said movement to said shearing knives, a delivery conveyor for delivering said web to said shearing knives, and a discharge conveyor for carrying cut sheets from said shearing knives; the improvement which comprises a web guiding device mounted between said delivery conveyor and said discharge conveyor, said device having a slot substantially in the plane of the delivery and discharge conveyors and projecting rearward from adjacent to said knives toward said delivery conveyor, said slot being adapted to receive a web moving from said delivery conveyor and to guide said web between said knives and to said discharge conveyor, means mounting said guiding device for reciprocatory movement between said conveyors and longitudinally of the path of movement of said web, and means for reciprocating said guiding device in timed relation with the movement of said shearing knives, whereby said device presents a newly cut leading edge of said web to said discharge conveyor after the web is cut by said shearing knives.

9. In a mechanism for transversely shearing a forwardly moving sheet material web; a pair of opposed shearing knives mounted for movement toward and away from each other into and out of a web shearing position and for movement in the same direction as said web during travel through said shearing position; means for imparting said movement to said shearing knives; a delivery conveyor for delivering said web forwardly to said shearing knives; a discharge conveyor for carrying out sheets from said shearing knives, said conveyors having conveying surfaces substantially in a common plane through which said web is longitudinally moved; a web receiving and transferring device mounted between said delivery conveyor and said discharge conveyor substantially in said plane of movement of said web for receiving said web as it travels between said conveyors, means mounting said device for reciprocation only in said plane and between said conveyors; and means connected to said device for reciprocating said device in timed relation with said movement of said shearing knives for presenting a newly cut leading edge of said web to said discharge conveyor after each shearing action of said shearing knives, said device comprising a pair of opposed plates spaced on opposite ends of said plane, a plurality of rearwardly projecting fingers fixed to the upper plate, and a plurality of rearwardly extending fingers fixed to the lower plate in opposition to the fingers on the upper plate, said delivery conveyor being adapted to project said web between said upper and lower fingers and their corresponding plates.

10. In a web shearing mechanism, a frame, means supported in said frame for transporting a web to be sheared along a predetermined path, a main slide rod rigidly mounted in said frame in laterally adjacent, substantially parallel relation to said path of the web, a slide block slidably mounted on said main rod, an auxiliary slide rod rigidly connected to said block and projecting therefrom in substantially normal relation to said main rod, a shearing knife, means slidably mounting said knife on said auxiliary rod with said knife projecting transversely of said path and of said main rod, and powered means connected to said knife mounting means for moving said knife about an axis projecting transversely of said main rod, said knife being constrained to orbital translatory movement by reciprocation on said auxiliary rod and by reciprocation of said block on said main rod during movement of said knife about said axis.

11. In a mechanism for shearing a longitudinally moving web of sheet material transversely of the sheet, a pair of opposed shearing knives mounted for movement toward and away from each other into and out of a web shearing position and for movement in the same direction as said web during travel through said shearing position; means for imparting said movement to said shearing knives; a delivery conveyor for delivering said web to said knives; a discharge conveyor for carrying cut sheets from said knives, said conveyors having conveying surfaces substantially in a common plane through which said web is longitudinally moved; a web receiving and transferring device mounted between said conveyors and having means forming a slot so that said slot is substantially in said plane of movement of said web for receiving said web as it comes from said delivery conveyor and for guiding said web as it travels between said conveyors, said slot forming means projecting from adjacent to said knives toward said delivery conveyor, means mounting said device for reciprocation of said slot forming means in said plane and between said conveyors; and means connected to said device for reciprocating said device in timed relation with said movement of said shearing knives for presenting a newly cut leading edge of said web to said discharge conveyor after each shearing action of said knives.

12. In an apparatus for shearing a web of sheet material which is continuously moved in a forward direction through a predetermined plane, a support; a web guide providing an elongated slot; first mounting means mounting said guide in said support with said plane passing through said slot and so that said slot slidably receives said web therethrough, said means also mounting said guide for forward and rearward reciprocatory movement; shearing means; second mounting means mounting said shearing means in said support for successive movement toward said plane to bring said shearing means into shearing engagement with a web being moved through said slot, thence forwardly with said web, and thence away from said plane and said web; and linkage means interconnecting said first and second mounting means for moving said web guide forwardly during forward movement of said shearing means and rearwardly during movement of said shearing means away from and thence toward said plane.

13. In a mechanism for shearing a web of sheet material into longitudinal segments of various lengths, a frame, a conveyor mounted in said frame for carrying a web of sheet material along a predetermined path, a shearing knife, means mounting said knife in said frame for orbital movement about an axis extending transversely of and in opposed relation to said path for shearing engagement with said web, a common source of rotary power for said conveyor and said knife and including a continuously rotating drive member supported in said frame, a first drive linkage interconnecting said member and said conveyor for motivating said conveyor and said web along said path, and a second drive linkage intermittently interconnecting said drive member and said mounting means for intermittently orbiting said knife at predetermined intervals, said second drive linkage including means for varying the length of the interval between successive orbitings of said knife independently of said first linkage and without affecting motivation of said conveyor so that such variations in length can be made without stopping the conveyor.

14. In a mechanism for shearing a web of sheet material into longitudinal segments of different lengths, a frame, a conveyor mounted in said frame for carrying a web of sheet material along a predetermined path, a shearing knife, means mounting said knife in said frame for orbital movement about an axis extending transversely of and in opposed relation to said path for shearing engagement with said web, a common source of rotary power for said conveyor and said knife and including a continuously rotating drive member supported in said frame, a first drive linkage interconnecting said member and said conveyor for motivating said conveyor and said web along said path, a second drive linkage intermittently interconnecting said drive member and said mounting means for intermittently orbiting said knife at predetermined intervals, and adjustable control means connected to said source of power and engaging said second drive linkage for varying the length of the interval between intermittent initiations of orbital travel of said knife without interrupting motivation of said conveyor.

15. In an apparatus including a support and means borne by said support for conveying a web of sheet material in a predetermined direction and along a predetermined web path, a mechanism for cutting the web transversely thereof and at intervals spaced longitudinally of the web comprising a knife; means mounting the knife in said support for movement in an orbital path about an axis extending transversely of and spaced from said path of the web, said knife being movable in its orbital path toward said web path, thence longitudinally of said web path in said predetermined direction for cutting engagement and movement with said web, and thence away from said web path out of web engagement; common rotary drive means mounted in said support; means coupling said drive means to said conveying means for imparting movement to said conveying means longitudinally of said web path; clutch means borne by the support having an operative condition interconnecting said drive means and said knife mounting means for moving said knife in its orbital path and an inoperative condition disconnecting said knife mounting means from said drive means; a latch mounted in said support for movement between a latching position in engagement with said clutch means for holding said clutch means in inoperative condition and an unlatched position wherein said clutch means is in operative condition; means yieldably holding said latch in latching position; a cam rotatably mounted in said support and intermittently moving said latch out of latching position in response to cam rotation; and variable speed transmission means interconnecting said cam and said drive means for imparting rotation to said cam at a velocity selectable by said transmission means without interrupting motivation of said conveyor or rotation of said cam so that by varying the length of the intervals between successive movements of said latch out of latching position and successive orbits of said knife the length of the intervals between successive cuts of the web is varied.

16. In an apparatus for shearing a web of sheet material which is continuously moved in a forward direction and along a predetermined plane, a support; shearing means; first mounting means mounting said shearing means in said support for movement in a predetermined path toward said plane to bring said shearing means into shearing engagement with a web being moved in said forward direction, thence forwardly with said web, and thence away from said plane and said web; a web guide having spaced upper and lower guide means; second mounting means mounting said guide in said support with said upper and lower guide means respectively located above and below said predetermined plane of the web and in rearwardly adjacent spaced relation to said path of said shearing means and with said guide means projecting rearward from said path for receiving the web therebetween and guiding its travel past said shearing means, said first mounting means also mounting said web guide for forward and rearward reciprocatory movement; and linkage means interconnecting said first and second mounting means for moving said web guide forwardly during forward movement of said shearing means and rearwardly during movement of said shearing means away from said plane.

17. The apparatus of claim 16 including a delivery conveyor mounted in said support and including a plurality of belts located in said plane in rearwardly spaced relation to said path, said belts being transversely spaced from each other with respect to said direction of movement of said web; and wherein said web guide includes a forward member in rearwardly adjacent spaced relation to said path and wherein said upper and lower guide means respectively include a plurality of upper and lower fingers secured to said forward member and projecting rearward therefrom and individually located between adjacent belts in said conveyor whereby said conveyor conveys a web of sheet material along said belts and between said upper and lower fingers during movement of said web past said shearing means.

18. In an apparatus for shearing a web of sheet material which is continuously moved in a forward direction while in a predetermined plane, a support; shearing means; first mounting means mounting said means shearing in said support for movement in a predetermined path toward said plane to bring said shearing means into shearing engagement with a web being moved in said forward direction, thence forwardly with said web, and thence away from said plane and said web; a web guide having an elongated guide means; second mounting means mounting said guide in said support with said guide means located below said predetermined plane and in rearwardly adjacent spaced relation to said path, said guide means projecting rearward from said path for guiding said web thereover and past said shearing means, said second mounting means also mounting said guide for forward and rearward reciprocatory movement; and linkage means connecting said first and second mounting means for moving said web guide forwardly during forward movement of said shearing means and thence rearwardly.

19. The apparauts of claim 18 including a delivery conveyor mounted in said support and including a plurality of belts located in said plane in rearwardly spaced relation to said path, said belts being transversely spaced from each other with respect to said forward direction of movement of said web; and wherein said web guide includes a forward member in rearwardly adjacent spaced relation to said path and wherein said guide means is a plurality of fingers secured to said forward member and projecting rearward therefrom and individually located between adjacent belts in said conveyor whereby said conveyor conveys a web of sheet material along said belts, and over said fingers during movement of said web past said shearing means.

20. In a web shearing mechanism, a frame, means supported in said frame for transporting a web to be sheared along a path in a predetermined plane, reciprocable means, means mounting said reciprocable means on said frame for reciprocating movement along a path that is in laterally adjacent and in substantially parallel relation to said path of the web, said mounting means constraining the reciprocable means to move only in said laterally adjacent path, a shearing knife having a cutting edge, means pivotally supporting said knife in said frame with said cutting edge extending transversely of the path of said web, powered means connected to said knife supporting means for moving said knife about an axis substantially parallel to said cutting edge of the knife, and means interconnecting said reciprocable means and said knife supporting means for maintaining said knife in a predetermined attitude during movement of said knife about said axis so that the angle between the plane of the knife and the plane of said web remains substantially constant.

21. In a web shearing mechanism, means for moving a web of sheet material along a predetermined path, upper and lower shearing knives extending transversely of and respectively above and below said path, journal members connected to said knives for rotation relative to said knives about axes extending lengthwise of their respective knives, means mounting said journal members for movement of said journal members and their upper and lower knives about axes of rotation respectively extending above and below said path, the axes of rotation of said knives and journal members being in spaced substantially parallel relation to their respective journal axes whereby said knives are moved successively toward and away from said path for shearing a web moving therealong, and means movable in a substantially rectilinear path that extends between the knives and being connected to said knives for movement in said rectilinear path during rotation of said knives and for maintaining the planes of said knives in predetermined angular relation to the path of said web during rotation of said knives.

22. In a web shearing mechanism, support means, means mounted in said support means for moving a web to be sheared along a predetermined path, a pair of gears rotatably mounted in said support means for rotation about a common axis extending transversely of and in spaced relation to said path, rod means secured to said gears and projecting inward therefrom, a shearing knife having a knife edge and being rotatably mounted on said rod means with said knife edge substantially parallel to said common axis, powered means connected to one of said gears for moving said knife about said common axis, and means mounted in said support means and constrained to movement in a path substantially parallel to the path of said web and being connected to said knife for constraining said knife to move with orbital translatory movement during rotation of said gears.

23. In a web shearing mechanism, frame means, means supported in said frame means for transporting the web to be sheared along a predetermined web path, an elongate shearing knife having a cutting edge, means supporting the said knife in said frame means with said cutting edge extending transversely of said web path and for movement of said edge about a main axis spaced from said path and substantially parallel to said edge, said supporting means also supporting said knife for rotatable movement about an axis eccentric to said main axis, and means supported in said frame means and constrained to move in a path substantially parallel to said web path and being connected to said knife for maintaining said cutting edge in a position facing said web path during rotation of said knife about said main axis.

References Cited in the file of this patent

UNITED STATES PATENTS

| | | |
|---|---|---|
| 1,034,164 | Swift | July 30, 1912 |
| 1,377,219 | Norton | May 10, 1921 |
| 1,635,171 | Bernstein | July 12, 1927 |
| 2,193,259 | Sheperdson | Mar. 12, 1940 |
| 2,640,539 | Piper | June 2, 1953 |
| 2,707,101 | Giskes et al. | Apr. 26, 1955 |
| 3,066,542 | Einhiple | Dec. 4, 1962 |